United States Patent
Kim et al.

(10) Patent No.: US 11,130,852 B2
(45) Date of Patent: Sep. 28, 2021

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Jeong Ju Moon, Daejeon (KR); Seok Ho Jeong, Daejeon (KR); Mi Yeon Lee, Daejeon (KR); Joo Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 304 days.

(21) Appl. No.: 16/318,073

(22) PCT Filed: Feb. 9, 2018

(86) PCT No.: PCT/KR2018/001777
§ 371 (c)(1),
(2) Date: Jan. 15, 2019

(87) PCT Pub. No.: WO2018/147690
PCT Pub. Date: Aug. 16, 2018

(65) Prior Publication Data
US 2021/0070964 A1    Mar. 11, 2021

(30) Foreign Application Priority Data
Feb. 10, 2017    (KR) .................. 10-2017-0018590

(51) Int. Cl.
*C08K 5/12* (2006.01)
*C08K 5/11* (2006.01)
*C08L 101/00* (2006.01)
*C08F 14/06* (2006.01)
*C08K 5/00* (2006.01)

(52) U.S. Cl.
CPC .............. *C08K 5/12* (2013.01); *C08F 14/06* (2013.01); *C08K 5/11* (2013.01); *C08L 101/00* (2013.01); *C08K 5/0016* (2013.01); *C08K 2201/014* (2013.01)

(58) Field of Classification Search
CPC .......... C08K 5/0016; C08K 5/11; C08K 5/12; C08K 2201/014; C08L 101/00
See application file for complete search history.

(56) References Cited

U.S. PATENT DOCUMENTS

| | | | |
|---|---|---|---|
| 8,783,860 B2 | 7/2014 | Orsi Mazzucchelli | |
| 9,234,086 B2 | 1/2016 | Kim et al. | |
| 2009/0312470 A1 | 12/2009 | Bradshaw et al. | |
| 2010/0113664 A1 | 5/2010 | Bradshaw et al. | |
| 2013/0169921 A1 | 7/2013 | Orsi Mazzucchelli | |
| 2015/0025185 A1 | 1/2015 | Kim et al. | |
| 2015/0105507 A1 | 4/2015 | Frey et al. | |
| 2016/0017120 A1 | 1/2016 | Frey et al. | |
| 2017/0081501 A1 | 3/2017 | Kim et al. | |
| 2018/0022893 A1 | 1/2018 | Kim et al. | |
| 2018/0265672 A1 | 9/2018 | Kim et al. | |
| 2019/0248995 A1* | 8/2019 | Chang | A61L 27/48 |

FOREIGN PATENT DOCUMENTS

| | | | | |
|---|---|---|---|---|
| CN | 1072428 | A | | 5/1993 |
| CN | 104284932 | A | | 1/2015 |
| CN | 104371210 | A | * | 2/2015 ............ B29C 48/92 |
| CN | 104893219 | A | | 9/2015 |
| CN | 105218964 | A | | 1/2016 |
| JP | 2013-129776 | A | | 7/2013 |
| KR | 10-0957134 | A | | 5/2010 |
| KR | 10-2015-0035499 | A | | 4/2015 |
| KR | 10-2016-0095875 | A | | 8/2016 |
| KR | 10-2016-0099453 | A | | 8/2016 |
| KR | 10-2016-0113034 | A | | 9/2016 |
| TW | 201700568 | A | | 1/2017 |
| WO | 2011/071674 | A1 | | 6/2011 |
| WO | 2012/004727 | A1 | | 1/2012 |
| WO | 2016/129876 | A1 | | 8/2016 |

* cited by examiner

*Primary Examiner* — Robert S Jones, Jr.
(74) *Attorney, Agent, or Firm* — Morgan, Lewis & Bockius LLP

(57) ABSTRACT

The present invention is a plasticizer composition which includes a trimellitate-based plasticizer and a citrate-based plasticizer, and does not contain epoxidized oil, and particularly, may provide a plasticizer composition which may improve physical properties such as migration resistance, tensile strength, an elongation rate, a retention characteristic and low-temperature resistance, required in the use of a plasticizer of a resin composition by improving problems inherent in a conventional plasticizer, and a resin composition including the same.

18 Claims, No Drawings

PLASTICIZER COMPOSITION AND RESIN COMPOSITION INCLUDING THE SAME

CROSS-REFERENCE TO RELATED APPLICATION

This application is a National Stage Application of International Application No. PCT/KR2018/001777 filed on Feb. 9, 2018, which claims priority to and the benefit of Korean Patent Application No. 10-2017-0018590, filed on Feb. 10, 2017, the disclosure of which is incorporated herein by reference in its entirety.

TECHNICAL FIELD

Technical Field

The present invention relates to a plasticizer composition and a resin composition including the same.

Background Art

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, adipate-, and other polymer-based plasticizers.

Meanwhile, in the compound industry requiring high thermal resistance and low volatile loss as main physical properties, considering the required physical properties, a suitable plasticizer should be used. In the case of PVC compounds for a wire and a cable, additives, for example, a plasticizer, a filler, a stabilizer and a flame retardant are added to a PVC resin depending on characteristics required for the corresponding specifications, such as tensile strength, elongation rate, plasticization efficiency, volatile loss, retentions of tensile strength and elongation.

At present, since diisodecyl phthalate (DIDP), which is typically used in wire compound and automobile fabric industries, is an environmental hormone under observation, and is restricted in use according to an environmental issue, a demand for the development of an eco-friendly product to substitute for DIDP is increasing. However, since even many substitutes partially contain a phthalate-based material, they still have environmental problems.

For this reason, studies have been progressing to develop a product of a novel eco-friendly plasticizer composition, which has better physical properties than DIDP, to thereby ensure a vinyl chloride-based resin composition which is free from environmental issues and has excellent quality.

PRIOR ART DOCUMENT

Patent Document (Patent Document 1) Korean Patent No. 10-0957134

DISCLOSURE

Technical Problem

The present invention is directed to providing a plasticizer composition which has excellent plasticization efficiency and migration resistance, is enhanced in tensile strength and an elongation rate, retention of tensile strength and retention of elongation, and has improved low-temperature resistance as a plasticizer applied to a resin composition, and a resin composition including the same.

Technical Solution

To achieve the object, according to an exemplary embodiment, the present invention provides a plasticizer composition, which includes a trimellitate-based plasticizer represented by Formula 1 below; and a citrate-based plasticizer represented by Formula 2 below; and does not contain epoxidized oil.

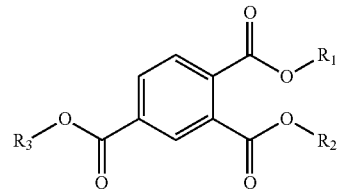

[Formula 1]

In Formula 1, $R_1$ to $R_3$ are each independently an alkyl group having 4 to 10 carbon atoms.

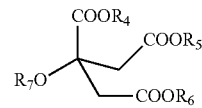

[Formula 2]

In Formula 2, $R_4$ to $R_6$ are each independently an alkyl group having 5 to 9 carbon atoms, and $R_7$ is hydrogen.

To achieve the object, according to an exemplary embodiment, the present invention provides a resin composition, which includes 100 parts by weight of a resin; and 5 to 150 parts by weight of the above-described plasticizer composition.

Advantageous Effects

When being used in a resin composition, a plasticizer composition of the present invention can be expected to have excellent plasticization efficiency and improved migration resistance, and reduced volatile loss and enhanced low-temperature resistance, as well as enhanced tensile strength, elongation rate, retention of tensile strength and retention of elongation.

MODES OF THE INVENTION

Hereinafter, the present invention will be described in further detail to help in understanding of the present invention.

The terms and words used in the specification and the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

Plasticizer Composition

According to an exemplary embodiment of the present invention, a plasticizer composition necessarily includes a trimellitate-based plasticizer represented by Formula 1 below and a citrate-based plasticizer represented by Formula 2, and does not contain epoxidized oil.

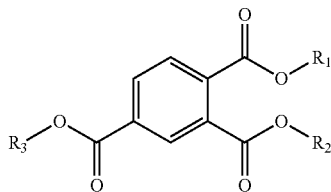

[Formula 1]

In Formula 1, $R_1$ to $R_3$ are each independently an alkyl group having 4 to 10 carbon atoms.

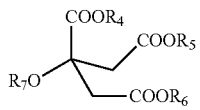

[Formula 2]

In Formula 2, $R_4$ to $R_6$ are each independently an alkyl group having 5 to 9 carbon atoms, and $R_7$ is hydrogen.

When the trimellitate-based plasticizer and the citrate-based plasticizer are included in the plasticizer composition, the upper limit of a weight ratio of the two materials may be 99:1, 95:5, 90:10, 85:15, 80:20, 70:30 or 60:40, and the lower limit of a weight ratio of the two materials may be 1:99, 5:95, 10:90, 15:85, 20:80, 30:70 or 40:60. The weight ratio of the two materials is preferably 90:10 to 10:90, more preferably 80:20 to 20:80, and further more preferably 70:30 to 30:70.

The plasticizer composition according to an exemplary embodiment of the present invention does not include epoxidized oil, in other words, is a plasticizer composition not containing epoxidized oil. Here, the phrase "not containing epoxidized oil" means exclusion of the application of epoxidized oil as a component of the plasticizer composition, and may also mean, even when the plasticizer composition is mixed with a resin in processing, epoxidized oil may be contained in the resin composition at less than 5 parts by weight, preferably less than 3 parts by weight, and more preferably less than 1 part by weight with respect to 100 parts by weight of the plasticizer composition. However, it is not necessary to exclude the addition of the epoxidized oil as a small amount of stabilizer when the resin composition is prepared.

While the epoxidized oil may have a specific effect on a property such as thermal resistance or oil resistance, a phenomenon in which a liquid plasticizer becomes a slurry at a low temperature, for example, approximately −5° C. or less, may occur, thereby causing a big problem in the storage and transfer of a product. Accordingly, when the resin is processed using the epoxidized oil-containing plasticizer, the transfer, delivery and processing of the plasticizer composition, and the low-temperature resistance characteristic of the resin composition probably deteriorate.

Further, when the epoxidized oil is contained in the plasticizer when being applied to a product requiring insulation performance, other than the above-mentioned problems, a phenomenon in which volume resistance is reduced may occur, compared with an eco-friendly plasticizer composition without a conventional phthalate product and epoxidized oil.

Therefore, to solve the above-mentioned problems, the plasticizer composition according to the present invention necessarily includes a trimellitate-based plasticizer and a citrate-based plasticizer as described above, as the plasticizer composition does not contain epoxidized oil, a low-temperature storage characteristic may be greatly enhanced, and it can be expected that the low-temperature resistance of the prepared resin product is improved, and insulation performance is improved due to enhanced volume resistance.

Trimellitate-Based Plasticizer

According to an exemplary embodiment of the present invention, the plasticizer composition may include a trimellitate-based plasticizer, which is represented by Formula 1 below and includes one or more materials represented by Formula 1 below.

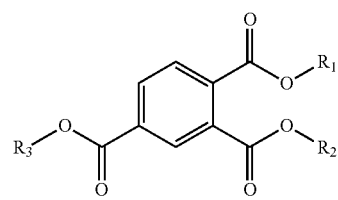

[Formula 1]

In Formula 1, $R_1$ to $R_3$ are each independently an alkyl group having 4 to 10 carbon atoms.

The trimellitate-based plasticizer is a material capable of compensating for a terephthalate-based plasticizer as described above, and may complement a characteristic, for example, migration resistance or volatile loss, which is achieved by a phthalate-based plasticizer, but not achieved by the terephthalate-based plasticizer.

In the trimellitate-based plasticizer, $R_1$ to $R_3$ of Formula 1 may have 4 to 10 carbon atoms, and each of $R_1$ to $R_3$ may be the same. If $R_1$ to $R_3$ are different from each other, two of $R_1$ to $R_3$ are the same, but the other is a different alkyl group. For example, the alkyl group may be, for example, a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group, or an isodecyl group.

In addition, when, among the alkyl groups, a normal alkyl group, that is, a linear alkyl group is applied, it has been known that a characteristic such as low-temperature resistance becomes excellent. However, commercially, a branched isoalkyl group is excellent in economic feasibility. In the case of such a trimellitate-based plasticizer, when the above-mentioned carbon number is satisfied, an effect of improving plasticization efficiency, migration resistance, volatile loss, retention of elongation and stress migration can be expected.

Citrate-Based Plasticizer

According to an exemplary embodiment of the present invention, the plasticizer composition may include a citrate-based plasticizer, which is represented by Formula 2 below, and include one or more materials represented by Formula 2 below.

[Formula 2]

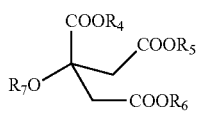

In Formula 2, $R_4$ to $R_6$ are each independently an alkyl group having 5 to 9 carbon atoms, and $R_7$ is hydrogen.

In the case of the citrate-based plasticizer, $R_4$ to $R_6$ of Formula 2 may be each independently a pentyl group, an isopentyl group, a hexyl group, an isohexyl group, a heptyl group, an isoheptyl group, a normal octyl group, a 2-ethylhexyl group, a normal nonyl group or an isononyl group, and $R_4$ to $R_6$ may be the same or different from each other.

The citrate in which $R_4$ to $R_6$ are different alkyl groups having 5 to 9 carbon atoms may be, for example, a citrate having a combined substituent of an isopentyl group and an isononyl group, a citrate having a combined substituent of 2-ethylhexyl group and an isononyl group, or a citrate having a combined substituent of an isopentyl group and a 2-ethylhexyl group, or may be any other citrates in which $R_4$ to $R_6$ have 5 to 9 carbon atoms, and which have a combined substituent of two alkyl groups having different numbers of carbon atoms. Here, the alkyl group may be linear or branched.

The citrate in which $R_4$ to $R_6$ are the same alkyl groups having 5 to 9 carbon atoms may be, for example, triisopentyl citrate (TIPC), trihexyl citrate (THxC), triheptyl citrate (THpC), triisoheptyl citrate (TiHpC), tri(2-ethylhexyl) citrate (TEHC), or triisononyl citrate (TINC), or may be any alkyl group having 5 to 9 carbon atoms.

Preferably, an alkyl group having 5 or more carbon atoms is applied, and when an alcohol having 5 to 9 carbon atoms, rather than those having more carbon atoms, even by a use of a small amount of such a plasticizer, the same or higher effects in plasticization efficiency and absorption rate may be exhibited. In addition, the upper limit of the number of carbon atoms of the alkyl group may be 9, and when the number of carbon atoms exceeds 9, due to an excessive increase in molecular weight, there is a concern about the deterioration of characteristics such as an absorption rate, plasticization efficiency, etc.

Meanwhile, when an acetyl group is present in the citrate-based plasticizer, that is, $R_7$ is an acetyl group, a physical property of the plasticizer, particularly plasticization efficiency, may be deteriorated, and additional equipment costs for treating waste citric acid generated as a byproduct may also be needed in a manufacturing process. When an acetyl group is introduced as described above, there may be considerations such as the addition of process steps and the increase in production costs due to the treatment of a byproduct.

In other words, in the citrate-based plasticizer, when $R_7$ of Formula 2 is an acetyl group, compared with hydrogen, problems of reduced plasticization efficiency, the addition of an increased amount of the plasticizer to overcome the reduced efficiency, and increased product costs thereby may accompany, and therefore, the citrate-based plasticizer in which $R_7$ is an acetyl group may not be superior to the plasticizer in which $R_7$ is hydrogen in various aspects such as marketability, economic feasibility and physical properties.

Preparation Method

In the present invention, a method for preparing the plasticizer composition may be a blending method, and a composition may be prepared by a process of preparing a trimellitate-based plasticizer and a citrate-based plasticizer independently, and then mixing them together.

When the trimellitate-based plasticizer is prepared by direct esterification, a process of applying one or more alcohols having $R_1$ to $R_3$ alkyl groups of Formula 1, for example, isopentyl alcohol, hexyl alcohol, heptyl alcohol, 2-ethylhexyl alcohol, isononyl alcohol and 2-propylheptyl alcohol, and reacting the alcohol(s) with trimellitic acid may be performed.

The direct esterification may be performed by adding trimellitic acid to an alcohol and adding a catalyst to induce a reaction under a nitrogen atmosphere; removing an unreacted alcohol and neutralizing an unreacted acid; and performing dehydration and filtration through vacuum distillation.

In addition, the alcohol may be used at 150 to 500 mol %, 200 to 400 mol %, 200 to 350 mol %, 250 to 400 mol %, or 270 to 330 mol % with respect to 100 mol % of trimellitic acid.

Meanwhile, the catalyst used in the esterification may be, for example, one or more selected from acid catalysts such as sulfuric acid, hydrochloric acid, phosphoric acid, nitric acid, para-toluenesulfonic acid, methanesulfonic acid, ethanesulfonic acid, propanesulfonic acid, butanesulfonic acid, and alkylsulfuric acid, metal salts such as aluminum sulfate, lithium fluoride, potassium chloride, cesium chloride, calcium chloride, iron chloride and aluminum phosphate, metal oxides such as a heteropoly acid, natural/synthetic zeolites, cation and anion exchange resins, and organic metals such as tetraalkyl titanate and a polymer thereof. Preferably, the catalyst is tetraalkyl titanate.

An amount of the catalyst used herein may vary according to its type, and as an example, a homogeneous catalyst may be used in a range of 0.01 to 5 wt %, 0.01 to 3 wt %, 1 to 5 wt % or 2 to 4 wt % with respect to 100 wt % of the total reactants, and a heterogeneous catalyst may be used in a range of 5 to 200 wt %, 5 to 100 wt %, 20 to 200 wt %, or 20 to 150 wt % with respect to the total weight of the reactants.

Here, the reaction temperature may be in a range of 180 to 280° C., 200 to 250° C., or 210 to 230° C.

To prepare the trimellitate-based plasticizer in a mixture, a trimellitate compound is prepared through direct esterification as described above, and then mixed together, or two or more types of alcohols may be applied in the direct esterification. Alternatively, the trimellitate-based plasticizer may be prepared through trans-esterification in which a trimellitate compound such as tri(2-ethylhexyl) trimellitate or triisononyl trimellitate is reacted with an alcohol such as 2-propylheptyl alcohol, isopentyl alcohol or heptyl alcohol.

The term "trans-esterification" used herein refers to a reaction between an alcohol and an ester in which R" of an ester is interchanged with R' of an alcohol as shown in Reaction Scheme 1:

[Reaction Scheme 1]

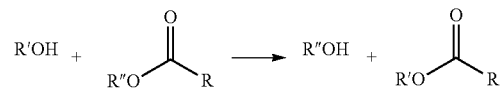

For instance, when trans-esterification is performed using isonoyl alcohol as an alcohol and tri(2-ethylhexyl) trimellitate as a trimellitate, an isonoxide of the alcohol attacks all carbonyl carbons in three 2-ethylhexyl (RCOOR") groups present in the trimellitate, and thus a trimellitate in which the 2-ethylhexyl (RCOOR") groups are substituted with isononyl groups may be formed; when carbonyl carbons in two 2-ethylhexyl groups are attacked, three types of compounds in which the two 2-ethylhexyl groups are substituted with isononyl groups may be formed; when carbonyl carbons of one 2-ethylhexyl group are attacked, three types of compounds in which one 2-ethylhexyl group is substituted with an isononyl group may be formed; and tri(2-ethylhexyl) trimellitate may remain as an unreacted portion that does not participate in the reaction.

According to an exemplary embodiment of the present invention, in the trimellitate-based plasticizer prepared by the trans-esterification, a composition ratio of compounds in the trimellitate-based composition may be controlled according to an amount of an alcohol added.

The amount of an alcohol added may be 0.1 to 89.9 parts by weight, specifically 3 to 50 parts by weight, and more specifically 5 to 40 parts by weight with respect to 100 parts by weight of the citrate.

According to an exemplary embodiment of the present invention, the trans-esterification may be performed at a reaction temperature of 120 to 190° C., preferably 135 to 180° C., more preferably 141 to 179° C. for 10 minutes to 10 hours, preferably 30 minutes to 8 hours, and more preferably 1 to 6 hours. Within the above-mentioned temperature and time ranges, the terephthalate-based plasticizer, which is a mixture with a desired composition ratio, may be effectively obtained. Here, the reaction time may be calculated from the point of time at which the reaction temperature is reached after increasing the temperature of reactants.

The trans-esterification may be performed in the presence of an acid catalyst or a metal catalyst, which provides an effect of reducing the reaction time.

The acid catalyst may be, for example, sulfuric acid, methane sulfonic acid, or p-toluene sulfonic acid, and the metal catalyst may be, for example, an organometallic catalyst, a metal oxide catalyst, a metal salt catalyst or a metal itself.

The metal component may be, for example, any one selected from the group consisting of tin, titanium and zirconium or a mixture of two or more thereof.

The direct esterification and the trans-esterification may also be used to prepare the above-described citrate-based plasticizer (using citric acid instead of trimellitic acid). In this case, like the trimellitate-based plasticizer, the citrate-based plasticizer may also be prepared in a mixture of components at a predetermined ratio, and the composition ratio of the mixture produced may be controlled by adjusting an alcohol content as a reaction material. Other details of preparing a citrate plasticizer through direct esterification or trans-esterification may be the same as those applied to the preparation of the trimellitate-based plasticizer.

In addition, as the reaction material, citric acid and trimellitic acid, which are carboxylic acid-based materials, may be replaced with an acid anhydride.

Meanwhile, the plasticizer composition may be prepared by preparing each component independently and then blending the components, or through simultaneous esterification with a component mixture.

Specifically, when alkyl groups having the same number of carbon atoms are intended to be applied to the citrate-based plasticizer and the trimellitate-based plasticizer, the plasticizer may be prepared through direct esterification of an acid mixture of citric acid and trimellitic acid with an alcohol having a specific alkyl group, and in this case, a plasticizer composition in which the alkyl groups of the citrate and the trimellitate have the same number of carbon atoms may be obtained.

That is, when the same alcohol is used, a simultaneous reaction between two or more acids or acid anhydrides and an alcohol may be a commercially economical method.

According to another exemplary embodiment of the present invention, there is provided a resin composition prepared by mixing 5 to 150 parts by weight, 20 to 100 parts by weight, 30 to 80 parts by weight or 40 to 70 parts by weight of the plasticizer composition prepared as described above with a resin, with respect to 100 parts by weight of the resin.

The resin may be selected from ethylene vinyl acetate, polyethylene, polypropylene, polyketone, polyvinyl chloride, polystyrene, polyurethane, and a thermoplastic elastomer.

In addition, the resin composition may be mixed with various additives such as a thermal stabilizer, a stabilizer, a lubricant, a filler, etc., and the type or content thereof may be determined as known in the art.

The resin composition prepared as described above may provide a resin composition effective in both of calendering and compound formulation, and the resin composition may be applied in, for example, manufacture of wires, flooring materials, interior materials for automobile, films, sheets, or tubes.

EXAMPLES

Hereinafter, to explain the present invention in detail, the present invention will be described in detail with reference to examples. However, examples according to the present invention may be modified in a variety of different forms, and the scope of the present invention should not be construed as being limited to the examples to be described below. The exemplary embodiments of the present invention are provided for those of ordinary skill in the art to more fully understand the present invention.

<Preparation of Trimellitate-Based Plasticizer>

Preparation Example 1

Preparation of Tributyl Trimellitate (TBTM)
1,112 g of tributyl trimellitate (yield: 98%) was finally obtained using 576.3 g of anhydrous trimellitic acid and 866 g of n-butyl alcohol as reaction materials.

Preparation Example 2

Preparation of Triisopentyl Trimellitate (TIPTM)
1,236 g of triisopentyl trimellitate (yield: 98%) was finally obtained using 576.3 g of anhydrous trimellitic acid and 1,030 g of isopentyl alcohol as reaction materials.

Preparation Example 3

Preparation of Trihexyl Trimellitate (THxTM)
1,360 g of trihexyl trimellitate (yield: 98%) was finally obtained using 576.3 g of anhydrous trimellitic acid and 1,196 g of hexyl alcohol as reaction materials.

Preparation Example 4

Preparation of tri(2-ethylhexyl) trimellitate (TEHTM)
1,607 g of tri(2-ethylhexyl) trimellitate (yield: 98%) was finally obtained using 576.3 g of anhydrous trimellitic acid and 1,521 g of 2-ethylhexyl alcohol as reaction materials.

Preparation Example 5

Preparation of Triisononyl Trimellitate (TINTM)

1,731 g of triisononyl trimellitate (yield: 98%) was finally obtained using 576.3 g of anhydrous trimellitic acid and 1,685 g of isononyl alcohol as reaction materials.

Preparation Example 6

Preparation tri(2-propylheptyl) trimellitate (TPHTM)

1,855 g of tri(2-propylheptyl) trimellitate (yield: 98%) was finally obtained using 576.3 g of anhydrous trimellitic acid and 1,852 g of 2-propylheptyl alcohol as reaction materials.

<Preparation of Citrate-Based Plasticizer>

Preparation Example 7

Preparation of Triisopentyl Citrate (TIPC)

1,183 g of triisopentyl citrate (yield: 98%) was finally obtained using 576 g of citric acid and 1,030 g of isopentyl alcohol as reaction materials.

Preparation Example 8

Preparation of Trihexyl Citrate (THxC)

1,307 g of trihexyl citrate (yield: 98%) was finally obtained using 576 g of citric acid and 1,196 g of hexyl alcohol as reaction materials.

Preparation Example 9

Preparation of tri(2-ethylhexyl) citrate (TEHC)

1,554 g of tri(2-ethylhexyl)citrate (yield: 98%) was finally obtained using 576 g of citric acid and 1,521 g of 2-ethylhexyl alcohol as reaction materials.

Preparation Example 10

Preparation of Triisononyl Citrate (TINC)

1,679 g of triisononyl citrate (yield: 98%) was finally obtained using 576 g of citric acid and 1,685 g of isononyl alcohol as reaction materials.

Plasticizer compositions of the examples were prepared by mixing the materials prepared in Preparation Examples 1 to 10, and then the plasticizer compositions of the examples, comparative examples and reference example were summarized in Table 1 below. Evaluation of the physical properties of the plasticizer compositions was performed according to the test items below. All of materials besides the materials prepared in the preparation examples are manufactured by LG Chem Ltd.

TABLE 1

| | Plasticizer A | Plasticizer B | Plasticizer C |
|---|---|---|---|
| Example 1 | TBTM 60 | TINC 40 | — |
| Example 2 | TIPTM 50 | TINC 50 | — |
| Example 3 | THxTM 40 | TEHC 60 | — |
| Example 4 | TEHTM 30 | THxC 70 | — |
| Example 5 | TINTM 20 | TIPC 80 | — |
| Example 6 | TPHTM 10 | TIPC 90 | — |
| Example 7 | TEHTM 70 | TIPC 30 | — |
| Example 8 | THxTM 80 | TEHC 20 | — |
| Example 9 | TBTM 90 | TINC 10 | — |
| Reference Example | DIDP[1] 100 | — | — |
| Comparative Example 1 | TPHTM 100 | — | — |
| Comparative Example 2 | TBTM 100 | — | — |
| Comparative Example 3 | — | TIPC 100 | — |
| Comparative Example 4 | — | TINC 100 | — |
| Comparative Example 5 | TEHTM 30 | TBC[2] 70 | — |
| Comparative Example 6 | TEHTM 70 | TUDC[3] 30 | — |
| Comparative Example 7 | TEHTM 70 | ATIPC[4] 30 | — |
| Comparative Example 8 | TBTM 60 | ATINC[5] 40 | — |
| Comparative Example 9 | TIPTM 50 | TINC 50 | ESO[6] |
| Comparative Example 10 | TINTM 20 | TIPC 80 | ESO[6] |

[1] DIDP: Diisodecyl phthalate
[2] TBC: Tributyl citrate
[3] TUDC: Triundecyl citrate
[4] ATIPC: Acetyl triisopentyl citrate
[5] ATINC: Acetyl triisononyl citrate
[6] Addition of 20 parts by weight of epoxidized soybean oil (ESO) with respect to 100 parts by weight of the sum of plasticizers A and B <Test Items>

Measurement of Hardness

Shore hardness (Shore "A") was measured at 25° C. under conditions of 3 T and 10 s according to ASTM D2240.

Measurement of Tensile Strength

According to ASTM D638, each specimen was pulled at a cross head speed of 200 mm/min (1T) using a tester U.T.M (Manufacturer; Instron, Model No.; 3345), until the specimen was broken. Tensile strength was calculated as follows:

Tensile strength $(kgf/cm^2)$=[Load value $(kgf)$/Thickness $(cm)$]×Width $(cm)$ Measurement of Elongation Rate According to ASTM D638, each specimen was pulled at a cross head speed of 200 mm/min (1T) using U. T. M until the specimen was broken. An elongation rate was calculated as follows:

Elongation rate (%)=(Length after elongation/Initial length)×100

Measurement of Migration Loss

An experimental specimen having a thickness of 2 mm or more was obtained according to KSM-3156, and a glass plate and wax paper were attached to both sides of the specimen, respectively, followed by applying a load of 2 $kgf/cm^2$. The specimen was maintained in a forced convection oven (80° C.) for 72 hours, then taken out of the oven, and cooled at room temperature for 4 hours. Afterward, following the removal of the glass plate and the wax paper attached to both sides of the specimen, the weights of the specimen before and after the maintenance in the oven were measured to calculate a migration loss by the equation below:

Migration loss (%)=[(Initial weight of specimen at room temperature−Weight of specimen after being maintained in oven)/Initial weight of specimen at room temperature]×100

Measurement of Volatile Loss

The prepared specimen was processed at 121° C. for 168 hours, and a weight of the specimen was measured:

Volatile loss (wt %)=[(Initial weight of specimen−Weight of specimen after processing)/Initial weight of specimen]×100

Measurement of Retentions of Tensile Strength and Elongation

Measurement of retentions of tensile strength and elongation was carried out by applying heat to specimens at 121° C. for 168 hours and measuring the retentions of tensile strength and elongation remaining in the specimens, and measurement methods are the same as those for tensile strength and an elongation rate.

Measurement of Low-Temperature Resistance

Temperatures at which three of five specimens previously manufactured were broken by an impact after they had been maintained at a specific temperature for 3 minutes were measured.

Experimental Example 1

Evaluation of Physical Properties 1

Specimens were manufactured using mixed plasticizer compositions of the examples and comparative examples listed in Table 1.

To manufacture a specimen, referring to ASTM D638, with respect to 100 parts by weight of a polyvinyl chloride resin (PVC (LS100)), 50 parts by weight of each of the plasticizer compositions prepared in the examples and the comparative examples, 5 parts by weight of RUP 144 (Adeka Korea Co., Ltd.) as a stabilizer, 40 parts by weight of Omya 1T (Omya Inc.) as a filler, and 0.3 part by weight of St-A (Isu Chemical, Co., Ltd.) as a lubricant were blended and mixed at 700 rpm and 98° C. Specimens were manufactured by processing the mixture using a roll mill at 160° C. for 4 minutes, and compressing the resulting product using a press at 180° C. for 3 minutes (low pressure) and 2.5 minutes (high pressure).

The specimens were evaluated for each of the test items, and the results are shown in Table 2 below.

Referring to Table 2, in the case of Examples 1 to 9, where a trimellitate-based plasticizer and a citrate-based plasticizer, which are materials in which an alkyl group having a proper number of carbon atoms is bonded, were suitably mixed, it can be confirmed that the plasticizers exhibited the same or superior physical properties, compared with DIDP as a reference. DIDP is a plasticizer product that has been widely used, and although having a high quality, DIDP causes an environmental problem as a phthalate-based product. That is, it is confirmed that all physical properties of the plasticizer compositions of Examples 1 to 9, compared with DIDP, can be improved to the same or higher levels as well as having environmental advantages.

However, it can be confirmed that, in contrast to Examples 1 to 9, when the trimellitate-based plasticizer or citrate-based plasticizer is solely used without mixing, migration loss is noticeably decreased as compared with DIDP, and Comparative Example 1 exhibits significantly lower plasticization efficiency (hardness), elongation rate and low-temperature resistance than Examples 1 to 9, and even than the conventional product DIDP. In addition, it can be confirmed that, compared with Examples 1 to 9, Comparative Example 2 is significantly decreased in retentions of tensile strength and elongation, Comparative Example 3 is significantly decreased in retention of tensile strength, and Comparative Example 4 is significantly decreased in plasticization efficiency and retention of elongation.

Further, it is apparent that in the case of Comparative Examples 5 and 6, which do not satisfy the range of the number of carbon atoms, exhibit a very low level of migration loss, and it can be confirmed that Comparative Example 5 has 4 citrate-based carbon atoms, not satisfying 5 to 9 carbon atoms, and has a volatile loss four times higher than the examples, and therefore a considerably large amount of

TABLE 2

|  | Hardness (Shore "A") | Tensile strength (kgf/cm$^2$) | Retention of Tensile strength (%) | Elongation rate (%) | Retention of elongation (%) | Migration loss (%) | Volatile loss (%) | Low-temperature resistance (° C.) |
|---|---|---|---|---|---|---|---|---|
| Example 1 | 87.8 | 172.3 | 102.4 | 310.2 | 95.6 | 0.89 | 2.67 | −30 |
| Example 2 | 88.1 | 169.8 | 99.6 | 308.1 | 88.3 | 1.46 | 2.49 | −29 |
| Example 3 | 88.2 | 173.5 | 101.2 | 307.3 | 95.8 | 1.50 | 2.07 | −29 |
| Example 4 | 88.7 | 175.8 | 98.6 | 298.7 | 99.5 | 1.62 | 2.54 | −30 |
| Example 5 | 88.0 | 178.2 | 103.4 | 310.0 | 98.5 | 1.24 | 2.89 | −30 |
| Example 6 | 88.1 | 179.8 | 98.0 | 302.8 | 95.9 | 0.90 | 2.72 | −29 |
| Example 7 | 88.5 | 178.9 | 96.8 | 305.8 | 96.0 | 1.90 | 1.50 | −30 |
| Example 8 | 86.9 | 168.9 | 93.7 | 280.4 | 96.1 | 0.77 | 1.68 | −31 |
| Example 9 | 85.7 | 165.3 | 95.4 | 311.8 | 92.5 | 0.56 | 3.84 | −32 |
| Reference | 89.1 | 160.2 | 90.3 | 276.1 | 81.1 | 1.84 | 7.35 | −26 |
| Comparative Example 1 | 93.4 | 180.3 | 92.3 | 254.0 | 88.7 | 2.75 | 1.47 | −25 |
| Comparative Example 2 | 85.0 | 151.3 | 93.4 | 302.4 | 74.2 | 2.60 | 5.20 | −32 |
| Comparative Example 3 | 87.8 | 163.4 | 88.2 | 303.4 | 85.1 | 1.95 | 3.67 | −29 |
| Comparative Example 4 | 93.0 | 172.0 | 90.5 | 260.3 | 80.4 | 2.80 | 3.45 | −28 |
| Comparative Example 5 | 88.1 | 162.4 | 80.1 | 288.7 | 76.5 | 2.41 | 8.61 | −30 |
| Comparative Example 6 | 95.4 | 178.0 | 93.5 | 230.4 | 93.4 | 3.55 | 1.20 | −25 | the plasticizer disappears during a heating process, and retention of tensile strength is also at a very low level. In addition, in Comparative Example 6, as the citrate-based plasticizer has more than 9 carbon atoms, it can be confirmed that the plasticization efficiency and the elongation rate are significantly decreased, and the low-temperature resistance is also at a low level.

Experimental Example 2

Evaluation of Physical Properties 2 (Difference According to Absence and Presence of Acetyl Group)

Specimens were manufactured as described in Experimental Example 1 using the mixed plasticizer compositions of the examples and the comparative examples listed in Table 1 and evaluated for each test item. The results are shown in Table 3 below.

TABLE 3

|  | Hardness (Shore "A") | Tensile strength (kgf/cm$^2$) | Retention of tensile strength (%) | Elongation rate (%) | Retention of elongation (%) | Migration loss (%) | Volatile loss (%) | Low-temperature resistance (° C.) |
| --- | --- | --- | --- | --- | --- | --- | --- | --- |
| Example 1 | 87.8 | 172.3 | 102.4 | 310.2 | 95.6 | 0.89 | 2.67 | −30 |
| Example 7 | 88.5 | 178.9 | 96.8 | 305.8 | 96.0 | 1.90 | 1.50 | −30 |
| Reference | 89.1 | 160.2 | 90.3 | 276.1 | 81.1 | 1.84 | 7.35 | −26 |
| Comparative Example 7 | 89.7 | 170.2 | 95.0 | 292.5 | 95.1 | 2.20 | 1.45 | −27 |
| Comparative Example 8 | 88.5 | 158.3 | 92.6 | 295.4 | 94.0 | 1.35 | 2.60 | −27 |

Comparative Examples 7 and 8 are prepared by using the plasticizers prepared by bonding an acetyl group to each of the citrate-based plasticizers applied in Examples 1 and 7, respectively, and referring to Table 3, when an acetyl group-bonded citrate is applied, it can be confirmed that Comparative Examples 7 and 8 were inferior to the conventional product DIDP in some of the physical properties, and were inferior to Examples 1 and 7 in all physical properties.

In addition, in the case of an acetyl group-binding citrate-based plasticizer, there is a considerable economic loss due to a complicated manufacturing process and waste acetic acid, and an environmental problem caused by the waste acetic acid has not been solved. Therefore, not only in terms of performance, but also economic and environmental aspects of the plasticizer, it can be confirmed that it is preferable to apply a plasticizer to which an acetyl group is not bonded.

Experimental Example 3

Evaluation of Physical Properties 3 (Difference According to Addition of Epoxidized Oil)

Specimens were manufactured using the mixed plasticizer compositions of the examples and comparative examples listed in Table 1 as described in Experimental Example 1 and evaluated for each test item. The results are shown in Table 4 below.

TABLE 4

|  | Hardness (Shore "A") | Tensile strength (kgf/cm$^2$) | Retention of tensile strength (%) | Elongation rate (%) | Retention of elongation (%) | Migration loss (%) | Volatile loss (%) | Low-temperature resistance (° C.) |
| --- | --- | --- | --- | --- | --- | --- | --- | --- |
| Example 2 | 88.1 | 169.8 | 99.6 | 308.1 | 88.3 | 1.46 | 2.49 | −29 |
| Example 5 | 88.0 | 178.2 | 103.4 | 310.0 | 98.5 | 1.24 | 2.89 | −30 |
| Reference | 89.1 | 160.2 | 90.3 | 276.1 | 81.1 | 1.84 | 7.35 | −26 |
| Comparative Example 9 | 88.7 | 160.4 | 93.4 | 288.5 | 87.2 | 1.30 | 2.41 | −24 |
| Comparative Example 10 | 88.6 | 170.0 | 95.2 | 297.2 | 96.4 | 1.44 | 2.73 | −24 |

Comparative Examples 9 and 10 are prepared by adding epoxidized soybean oil as an epoxidized oil to the plasticizer compositions of Examples 2 and 5, respectively. Referring to Table 4, it can be confirmed, that Comparative Examples 9 and 10 had poor low-temperature resistance, compared with the conventional product DIDP, and were decreased in plasticization efficiency, significantly decreased in retention of tensile strength and significantly decreased in elongation rate, compared with the examples in which epoxidized oil was not added.

Accordingly, it was confirmed that, in the case of the plasticizer composition in which the trimellitate-based plasticizer is mixed with the citrate-based plasticizer, the number of carbon atoms of each material is necessarily controlled, and a citrate-based plasticizer to which an acetyl group is not bonded should be used as the citrate-based plasticizer, and the addition of the epoxidized oil is not preferable in terms of the quality of the plasticizer.

While the present invention has been described in detail with reference to exemplary embodiments of the present invention, it should be understood by those of ordinary skill in the art that the scope of the present invention is not limited thereto and various forms of modification and alternation based on the fundamental ideas of the present invention defined by the accompanying claims are also included within the scope of the present invention.

The invention claimed is:

1. A plasticizer composition, comprising:
   a trimellitate-based plasticizer represented by Formula 1; and
   a citrate-based plasticizer represented by Formula 2,
   wherein the plasticizer composition does not contain epoxidized oil,
   wherein the trimellitate-based plasticizer and the citrate-based plasticizer are included at a weight ratio of 90:10 to 10:90:

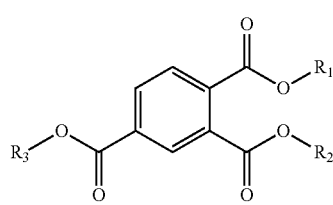

[Formula 1]

wherein, in Formula 1, $R_1$ to $R_3$ are each independently an alkyl group having 4 to 10 carbon atoms,

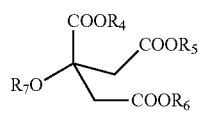

[Formula 2]

wherein, in Formula 2, $R_4$ to $R_6$ are each independently an alkyl group having 5 to 9 carbon atoms, and $R_7$ is hydrogen.

2. The plasticizer composition of claim 1, wherein the trimellitate-based plasticizer and the citrate-based plasticizer are included at a weight ratio of 70:30 to 30:70.

3. The plasticizer composition of claim 1, wherein $R_1$ to $R_3$ in Formula 1 are each independently selected from the group consisting of a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group, and an isodecyl group.

4. The plasticizer composition of claim 1, wherein $R_4$ to $R_6$ in Formula 2 are each independently selected from the group consisting of a pentyl group, an isopentyl group, a hexyl group, an isohexyl group, a heptyl group, an isoheptyl group, a normal octyl group, a 2-ethylhexyl group, a normal nonyl group and isononyl group.

5. A resin composition, comprising:
   100 parts by weight of a resin; and
   5 to 150 parts by weight of the plasticizer composition of claim 1.

6. The resin composition of claim 5, wherein the resin is one or more selected form the group consisting of ethylene vinyl acetate, polyethylene, polypropylene, polyketone, polyvinyl chloride, polystyrene, polyurethane, and a thermoplastic elastomer.

7. The resin composition of claim 5, wherein the resin composition includes an epoxidized oil in an amount of less than 5 parts by weight with respect to 100 parts by weight of the plasticizer composition.

8. The plasticizer composition of claim 1, wherein the plasticizer composition does not include an epoxidized oil.

9. The plasticizer composition of claim 1, wherein $R_4$ to $R_6$ in Formula 2 are a hexyl group.

10. The plasticizer composition of claim 1, wherein $R_4$ to $R_6$ in Formula 2 are an isopentyl group.

11. The plasticizer composition of claim 1, wherein $R_4$ to $R_6$ in Formula 2 are a hexyl group.

12. The plasticizer composition of claim 1, wherein $R_4$ to $R_6$ in Formula 2 are an isohexyl group.

13. The plasticizer composition of claim 1, wherein $R_4$ to $R_6$ in Formula 2 are a heptyl group.

14. The plasticizer composition of claim 1, wherein $R_4$ to $R_6$ in Formula 2 are an isoheptyl group.

15. The plasticizer composition of claim 1, wherein $R_4$ to $R_6$ in Formula 2 are a normal octyl group.

16. The plasticizer composition of claim 1, wherein $R_4$ to $R_6$ in Formula 2 are a 2-ethylhexyl group.

17. The plasticizer composition of claim 1, wherein $R_4$ to $R_6$ in Formula 2 are a normal nonyl group.

18. The plasticizer composition of claim 1, wherein $R_4$ to $R_6$ in Formula 2 are isononyl group.

* * * * *